(12) United States Patent
Dromerhauser et al.

(10) Patent No.: US 12,401,966 B2
(45) Date of Patent: Aug. 26, 2025

(54) METHOD AND NETWORK STORAGE DEVICE FOR PROVIDING SECURITY

(71) Applicant: Enigma-Bulwark, Ltd, Santa Monica, CA (US)

(72) Inventors: Dan Dromerhauser, Hollywood, FL (US); Joshua S. Paugh, Tucson, AZ (US); Nathaniel T. Bradley, Tucson, AZ (US)

(73) Assignee: ENIGMA-BULWARK, LTD, Santa Monica, CA (US)

( * ) Notice: Subject to any disclaimer, the term of this patent is extended or adjusted under 35 U.S.C. 154(b) by 0 days.

(21) Appl. No.: 17/702,095

(22) Filed: Mar. 23, 2022

(65) Prior Publication Data

US 2022/0217495 A1 Jul. 7, 2022

Related U.S. Application Data

(63) Continuation of application No. 16/618,038, filed as application No. PCT/US2018/035185 on May 30, 2018, now Pat. No. 11,310,623.

(60) Provisional application No. 62/513,315, filed on May 31, 2017.

(51) Int. Cl.
| | | |
|---|---|---|
| *H04W 4/00* | (2018.01) | |
| *G06Q 10/02* | (2012.01) | |
| *H04L 9/40* | (2022.01) | |
| *H04W 4/021* | (2018.01) | |
| *H04W 4/06* | (2009.01) | |
| *H04W 12/08* | (2021.01) | |

(52) U.S. Cl.
CPC ............ *H04W 4/021* (2013.01); *G06Q 10/02* (2013.01); *H04L 63/10* (2013.01); *H04W 4/06* (2013.01); *H04W 12/08* (2013.01)

(58) Field of Classification Search
CPC ....... H04W 4/021; H04W 4/06; H04W 12/08; G06Q 10/02; H04L 63/10
See application file for complete search history.

(56) References Cited

U.S. PATENT DOCUMENTS 6,400,265 B1 * 6/2002 Saylor ................ G08B 13/1966
340/506
8,965,460 B1 * 2/2015 Rao .................. H04N 21/41407
455/566

(Continued)

FOREIGN PATENT DOCUMENTS

| WO | 2014105349 A1 | 7/2014 |
|---|---|---|
| WO | 2014105349 A9 | 1/2015 |

OTHER PUBLICATIONS

Extended European Search Report issued by European Patent Office on Aug. 26, 2021, European Patent No. 18810464.0, 10 pages.

(Continued)

*Primary Examiner* — Md K Talukder
(74) *Attorney, Agent, or Firm* — Goodhue, Coleman & Owens, P.C.

(57) ABSTRACT

A security system, method, and network device. Security is aggregated from wireless devices and fixed devices at an event. The wireless devices are associated with at least a portion of users attending the event. A selection of the security content is displayed. Prompts regarding a security status of the event are displayed. The prompts are sent regarding a security status of the event to selected users.

20 Claims, 5 Drawing Sheets

(56) References Cited

U.S. PATENT DOCUMENTS

| | | | | |
|---|---|---|---|---|
| 2006/0222244 | A1* | 10/2006 | Haupt | G06V 40/173 |
| | | | | 382/220 |
| 2010/0062770 | A1* | 3/2010 | Flynn | H04W 12/12 |
| | | | | 455/466 |
| 2014/0132765 | A1 | 5/2014 | Billau et al. | |
| 2014/0187190 | A1* | 7/2014 | Schuler | H04W 12/084 |
| | | | | 455/404.1 |
| 2014/0375800 | A1 | 12/2014 | Lim et al. | |
| 2015/0097962 | A1* | 4/2015 | Rauscher | G06T 5/50 |
| | | | | 348/159 |
| 2015/0347827 | A1* | 12/2015 | Dickinson | H04N 21/4788 |
| | | | | 382/103 |
| 2015/0350820 | A1* | 12/2015 | Son | H04W 12/03 |
| | | | | 455/41.2 |
| 2016/0063105 | A1* | 3/2016 | Renkis | H04L 41/22 |
| | | | | 348/159 |
| 2016/0360160 | A1* | 12/2016 | Eizenberg | H04N 23/661 |
| 2018/0176727 | A1* | 6/2018 | Williams | A61B 5/6802 |
| 2020/0169834 | A1* | 5/2020 | Dromerhauser | H04W 4/029 |
| 2020/0349829 | A1* | 11/2020 | Larsen | H04N 7/188 |
| 2021/0174347 | A1* | 6/2021 | Rose | H04L 63/0428 |
| 2022/0217495 | A1* | 7/2022 | Dromerhauser | H04W 4/021 |

OTHER PUBLICATIONS

International Preliminary Report on Patentability, PCT/US18/35185, Dec. 12, 2019, 8 pages, no new references.
International Search Report & Written Opinion, PCT/US18/35185, Aug. 3, 2018, 17 pages.
Supplementary European Search Report issued by European Patent Office on May 26, 2021, European Patent No. 18810464.0,.

* cited by examiner

METHOD AND NETWORK STORAGE DEVICE FOR PROVIDING SECURITY

PRIORITY STATEMENT

This application is a continuation of U.S. Non-Provisional patent application Ser. No. 16/618,038, filed on Nov. 27, 2019, which is a 371 of International Application No PCT/US18/35185, filed May 30, 2018, which claims the benefit of U.S. Provisional Patent Application 62/513,315, filed on May 31, 2017, entitled Networked Based Video Surveillance and Logistics for Multiple Users, hereby incorporated by reference in its entirety.

BACKGROUND

I. Field of the Disclosure

The illustrative embodiments relate to security systems. More specifically, but not exclusively, the illustrative embodiments relate to a networked system for performing surveillance utilizing multiple devices and users.

II. Description of the Art

The growth of networks, cameras, and audio enabled electronics is increasing exponentially. This growth is fostered by the decreasing size of microprocessors, circuit boards, chips, and other components. In some cases, electronic devices have become wearable as well as easily installed in distinct areas and locations. Despite the enhancement and availability of devices, aggregating or combining available information for security purposes may be extremely difficult.

SUMMARY OF THE DISCLOSURE

One embodiment of the illustrative embodiments provides a method of providing security, a security system, and network storage device. Security is aggregated from wireless devices and fixed devices at an event. The wireless devices are associated with at least a portion of users attending the event. A selection of the security content is displayed. Prompts regarding a security status of the event are displayed. The prompts are sent regarding a security status of the event to selected users. Another embodiment provides a network storage device. The network storage device includes a processor executing a set of instructions. The network storage device includes a memory for storing the set of instructions. The set of instructions are executed to perform the method herein described.

Another embodiment provides a system, method, and network device for security. The improvised security system includes one or more communications networks including at least one wireless network. The improvised security system further includes a network storage device operatively connected to the one or more communications networks for storing feeds. The improvised security system further includes a number of mobile devices communicating with the network storage device through the one or more communications networks. The mobile devices capture feeds that are sent to the network storage device. The mobile devices receive prompts sent by the network storage device regarding activities at the location. Another embodiment provides a network storage device or digital video recorder including a processor and a memory storing a set of instructions. The set of instructions are executed to perform the method described.

In another embodiment, the fixed security devices include one or more of fixed video cameras, microphones, and sensors communicating with the network storage device through the one or more communications networks. A session may be created for the security content such that the security content is accessible to authorized user accessing the session. The security content may include one or more audio feeds, video feeds, and sensor feeds. The user of the mobile devices may represent participants of an event at the location. The participants may be compensated for sharing the security content with the network storage device. The compensation may include payments of money or discounts for services or products. The security content may include a location associated with each of the mobile devices that captures the security content.

Another embodiment provides a method for providing security. Security content is aggregated from a number of mobile devices and a number of fixed devices. A selection of the security content is displayed. Prompts regarding the security status of an event is sent to selected users.

In another embodiment, additional streams of security content are added as the streams of security content become available from the mobile devices. The prompts may be automatically sent in response to one or more thresholds or criteria being met. The mobile devices may be from participants of an event at the location. The method may further include enabling a security application executed on a wireless device to receive an identifier, authenticating the identifier is associated with security for the location and determining a location associated with the wireless device. The method may further include generating a security profile associated with the location from the available security content. The participants that share security content may be compensated.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
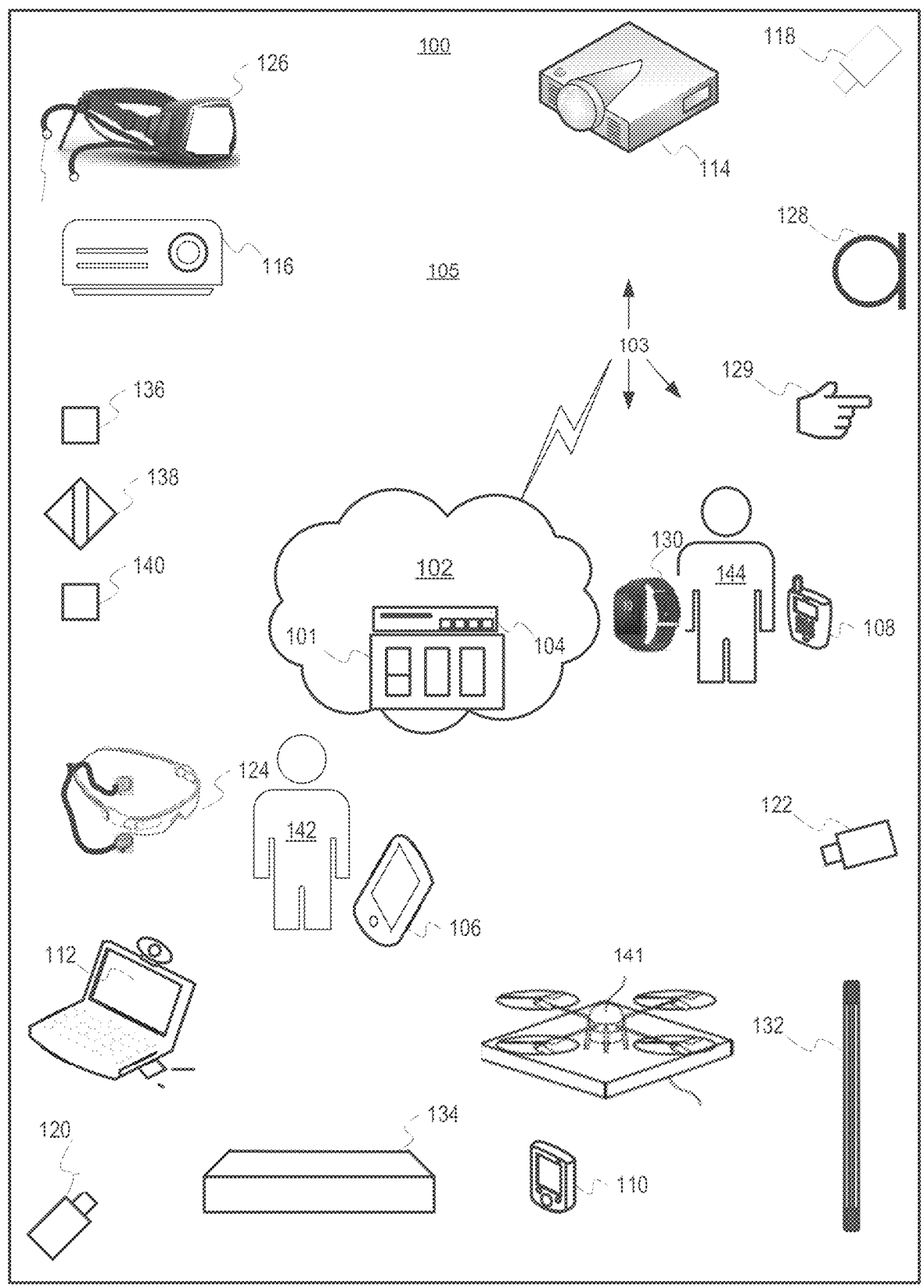
FIG. 1 is a pictorial representation of a security system in accordance with an illustrative embodiment.

The illustrative embodiments provide a system, method, and network for video-based surveillance and logistics for multiple users. The various embodiments may be utilized to provide an improvised security system. The security system may be utilized for any number of locations, buildings/structures, venues, or events. The security system may include any number of fixed or permanent resources (e.g., video cameras, microphones, sensors, etc.) as well as temporary or mobile resources (e.g., cell phones, temporary communications towers, mobile microphones, wireless sensors, wearables, hearables, etc.).

In one embodiment, the content captured by the security system (e.g., video, audio, streaming content, sensor readings, etc.) may be stored in a cloud network, such as a central video storage device. The content from the various resources (e.g., fixed, temporary, etc.) may be aggregated for any number of administrators, security professionals, managers, or other users to quickly and efficiently review and select content.

The selected content may be displayed to any number of displays or communications devices (e.g., laptops, desktop computers, television displays, smart phones, tablets, electronic glass, smart glasses, augmented reality displays, virtual reality systems, vehicle systems, etc.). Any number of sensors may be utilized. For example, audio, proximity, infrared, radiation, carbon dioxide, gas, or other sensors may be utilized as needed.

In one embodiment, the individual resources may be integrated with the security system utilizing an invitation. The invitation may represent a text message, email, in-app communication, emergency broadcast, phone call, or so forth. In one embodiment, the invitation may be self-authenticating. In another embodiment, a security session may be created for individuals/devices that join or otherwise communicate with the security system. For example, an identifier, such as a pin number, password, event code, event name, security question, verified location, available signal, or so forth may be utilized to verify that the user is authorized to participate.

In one embodiment, individual users may be incentivized to participate through payments, discounts, tickets, food, or so forth. The users may even be provided with a specialized device, such as a hat or lapel with a wireless camera and microphone integrated. As a result, the security system may randomly and anonymously monitor the event. The specialized device may also include a global positioning system, beacon system, logic, power source (e.g., battery, fuel cell, solar cell, etc.), transceiver, and other components for communicating with the security system. In another embodiment, the user may be provided with instructions for utilizing their own personal electronics to connect with the security system. For example, a camera of a smart phone may be utilized to stream content to the security system. In another example, the user may be provided with a harness and battery for securing their personal electronic device in a desirable position and orientation when not being utilized to perform security monitoring. For example, the user's smart phone may be strapped to her chest or shoulder when not in use to perform various security functions. Any number of other attachment components or connectors, such as straps, pockets, bands, Velcro, sockets, cases, mounts, may also be utilized.

The illustrative embodiments may utilize any number of notifications, alerts, messages, prompts, or other communications to send security related information. For example, a non-verbal or non-inaudible communication may be sent to specified users providing a warning. The warning may specify that the users are to be vigilant for a man in a blue shirt acting suspiciously. The warning may also specify that the security system has detected that there is an unusually high number of people in a particular area indicating a potential problem or issue. The communications performed by the security system may be performed directly between devices, utilizing one or more available networks, utilizing other devices (e.g., mesh networks), or so forth. As a result, any number of impromptu, improvised, temporary, or moving security systems may be established.

FIG. 1 is a pictorial representation of a security system 100 in accordance with an illustrative embodiment. In one embodiment, the security system 100 may include any number of devices, components, equipment, users, networks, or so forth. In one example, the security system 100 may include a communications network 102, a security platform 101, a digital video recorder 104, smart phones 106, 108, 110, laptop 112, projectors 114, 116, security cameras 118, 120, 122, augmented reality glasses 124, virtual reality system 126, microphone 128, smart glove 129, smart watch 130, display 132, holographic display 134, sensors 136, 138, 140, drone 141, and users 142, 144.

Altogether, the security devices of FIG. 1 be referred to as the security devices 103 (potential examples include, but are not limited to, the smart phones 106, 108, 110, laptop 112, smart watch 130, projector 114, augmented reality glasses 124, microphone 128, smart glove 129, projectors, 114, 116, security cameras 118, 120, 122, holographic display 134, sensors 136, 138, 140, drone 141, wearables, hearables, personal/commercial electronics, etc.) represented by temporary, fixed, wired, and wireless devices. Any of the security devices 103 may include cameras, microphones, sensors (e.g., accelerometers, gyroscopes, radiation detectors, magnetometers, thermometers, barometers, etc.), vibration components, user interfaces, transceivers, or other components that may be utilized by the security system 100 and for the processes herein described.

The security system 100 may be integrated or used in any number of buildings, venues, fields, parks, stadiums, areas, or events referred to as location 105. The various components of the security system 100 including the security devices 103 may communicate with the communications network 102 utilizing wired or wireless connections. In one embodiment, the communications network 102 may represent dedicated hardware and software implemented by available wireless service providers. The communications network 102 may also represent temporary infrastructure for providing wireless or wired communications. In one example, the communications network 102 may represent a cellular network (e.g., 2G, 3G, 4G, 5G, PCS, CDMA, GSMR, etc.) along with a number of Wi-Fi networks to further facilitate communications. However, any number of other standard, custom, or proprietary wireless standards may also be utilized (e.g., Bluetooth, near field communications, WLAN, satellite, etc.). In another example, the communications network 102 may represent a temporary wired connection, such as an Ethernet network or powerline network. However, any number of other wired standards, connections, or links may be utilized (e.g., fiber optics, T1, cable, DSL, high speed trunks, telephone lines, etc.).

The security content may be managed from a network storage device. In one embodiment, the network storage device is the digital video recorder 104. For example, the digital video recorder 104 may represent a stand-alone device. In another example, the digital video recorder 104 may represent one of a number of digital video recorders that may be integrated with the security platform 101. The description for the digital video recorder 104 may refer to the digital video recorder 104 alone or the digital video recorder 104 integrated as part of a cloud security network (e.g., network 102) and security platform 101. The digital video recorder 104 receives, stores, streams, and archives video from the security devices 104. The digital video recorder 104 may receive and process one or hundreds of content streams at a time. The digital video recorder 104/ security platform 101 is further illustrated in FIG. 2. In another embodiment, the digital video recorder 104 may represent specialized or customized multiple media servers configured to receive, process, separate, and index security content as it is received for subsequent analysis or review. For example, the digital video recorder 104 may include multiple graphics processors, ports, transceivers, or so forth.

In one embodiment, the security platform 101 may include any number of servers, databases, converters, routers, repeaters, or so forth. The video stored on the server may be requested for review, playback, enhancement (e.g., adding time stamps, location information, etc.), or on-demand review at any time with authorized credentials (e.g., username, password, granted access rights, etc.). The security platform 101 may also utilize any number of commercially available streaming services to communicate content. The security content may be shared utilizing any number of websites, communities, cloud networks or platforms (e.g., social media-Facebook, twitter, Instagram, etc.), or file sharing services.

In one embodiment, the security platform 101 and network 102 may be utilized to provide software-as-a-service (SaaS). For example, applications downloaded and executed by one or more of the security devices 103 at the location 103 may be utilized to generate and manage security content from a number of users, organizations, companies, groups, or so forth. A one-time, annual, monthly, per-event, or other service fee may be utilized to utilize the application and/or associated video services. One or more service providers may operate the security system 100. The service providers may service hundreds or thousands of clients with integrated video services.

The security devices 103 capture data feeds corresponding to their components and functionality. For example, the security devices 103 may capture video (e.g., utilizing various spectra including, but not limited to, optical, infrared, ultra violet, x-ray, blue light, red light, green light, etc.), audio, sensor readings, tactile feedback, etc.), audio, movement, temperature, gas levels, wind, speed, altitude, moisture/humidity, seismic information, user locations/orientations, security device location, orientation, and view, and so forth that may be generally referred to as a data feed. The security devices 103 generate on-demand data feeds that may be communicated to the digital video recorder 104 or security platform 101. Access to the data feeds may be similarly controlled. As a result, a number of authorized users may be able to access and manage the data feeds. The same group or a different group of authorized users may also receive verbal, audio, or silent notifications and prompts.

In one embodiment, a specialized application, dedicated hardware, a browser, connections/signal, or other hardware or software component may be utilized to connect to the digital video recorder 104 or the security platform 101. For example, a special event/location number or pin number may be required to provide access information. In some examples, different identifiers may provide distinct access to the users 142, 144 and security devices 103. For example, a first pin may authorize the security devices 103 to stream content to the digital video recorder 104 and a second pin may authorize one of the security devices (i.e., smart phone 106) to manage the content, navigate feeds, send prompts or alerts, review recorded content, and so forth. In one embodiment, the security devices 103 may automatically grant access to share captured content (e.g., video, audio, sensors, etc.) in response to entering a specified geographic location (e.g., geofence created using global positioning system coordinates), a work shift beginning, participating in an event (e.g., pre-authorization in response to buying tickets or an entrance fee, receiving signals from a beacon, mobile app installation, etc.), and so forth.

In one embodiment, the users are provided with a benefit (e.g., monetary, discount, added services, etc.) for participating in the security system 100 and services and/or by associating their respective device with the security system 100, network 102, security platform 102, digital video recorder, or other security devices 103. For example, a concert goer that participates by providing video content associated with a GoPro type camera may be given a discount on concessions at the event, free refreshments, digital content, or souvenirs. The user may be required to provide the video content for a specified amount of time or the full time of the event. In another example, an individual (e.g., such as user 144) visiting a hospital may be provided with a free meal in response to making sensors in her smart watch 130 and smart phone 108 available to make various measurements (e.g., oxygen levels, noise levels, etc.) that are sent to the security system 100.

The combined content from the security devices 103, both fixed and temporary, provides enormous flexibility to individuals providing security for the location 105 or event. In one embodiment, the security system 100 provides a nearly 360-degree security profile of the location/event where the security profile may include video, audio, sensor readings, positioning information, and so forth. In one embodiment, each feed may indicate a location and orientation of the associated security device. The location and orientation may specify relative information, such as section A, level 2, and South-facing. In another example, the location information may specify a mobile user currently in the line at the cafeteria. For example, the security system 100 may be adaptable to the locations of different users and the dynamic nature of different events.

In one embodiment, the security devices 103 may constantly capture the applicable information and time/date. In another embodiment, the security devices 103 may capture the data feed in response to thresholds, criteria, or settings, such as location, activity/action, threshold levels, administrative activation, user activation, detected events, alerts, or so forth.

In one embodiment, security guards may wear electronic glasses or optical sensors, such as the smart glasses 124, to directly or indirectly capture audio, video, and sensor readings that are sent to the digital video recorder 104. In one embodiment, the smart glasses 124 may include a user interface including any number of hardware or software buttons that enable the smart glasses 124 to capture and communication video/audio content. For example, the buttons of the smart glasses 124 may be utilized to send a silent alert or prompt to other devices, such as to alert other security devices 103 in an area associated with the smart glasses 124 to record video content and for the user 142 to view the video content. The user interface may also be utilized to send and receive voice communications with other devices. In one example, the smart glasses 124 may communicate directly with a router of the network 102 utilizing a communications standard, protocol, and signal. The smart glasses 124 may also communicate with the network 102 through one of the security devices 103, such as the smart phone 110.

The smart glasses 124 are one example of the security devices 103 with the included description being applicable to any of the security devices 103 and corresponding components. The smart glasses 124 are a wearable computer that adds information to what the wearer naturally sees. In one embodiment, the smart glasses 124 may include an optical head-mounted display (OHMD), a computerized Internet connected glasses with transparent heads up display (HUD), or an augmented reality overlay that has the capability of reflecting projected digital images. In another embodiment, the smart glasses 124 may represent virtual reality or holographic display devices (e.g., devices produced by Oculus VR, Sony, Microsoft, Google, etc.). The smart glasses 124 may include a frame and logical components. The frame may be the support structure of the smart glasses 110. In one embodiment, the frame may be physically connected across the lenses and bridge. In one embodiment, the logical components are embedded or integrated with the frame. For example, the logical components may be removed for upgrading the smart glasses 124 over time. The logical components may include any number of components including one or more batteries, memories, logic units (e.g., processors, ASICs, FPGAs, digital logic, etc.), transceivers, cameras, speakers, motherboards, circuits, contacts, ports, adapters, connectors, or so forth. The logical components may be connected to the different components within the smart glasses 110 utilizing any number of traces, contacts, wires, busses, or so forth. The connection components may be transparent or positioned to minimize visibility (e.g., within the lenses).

In one embodiment, the lenses may be a transparent display that presents security data without requiring the user 142 to look away from his/her usual viewpoints. The lenses may be transparent displays for displaying information and content to the user 142. For example, the lenses may include electronic glass for displaying content for the user 142. For example, the lenses may display content that is displayed in a single direction toward the user 142 such that the displayed content is not visible on the other side of the smart glasses 124 to preserve the security and confidentiality of the content and privacy of the user 142. In one embodiment, interactive content may be displayed across an entire surface of the lenses. In another embodiment, the content may be display on one or more designated segments. The smart glasses 142 are configured to allow the user full access to real world content while still displaying other content which may include graphics, data, programs, augmented reality content, or other information. The lenses may provide full view to the user's surroundings as well as to focused views of various data streams communicated to the smart glasses 1142 and available through the personal area network/network 102 available to the user 142.

The lenses may also be adaptive optics that change the focal length or provide augmented views of the surroundings. In one embodiment, the lenses may include liquid display components (adjustable focus eyeglasses) that may dynamically reconfigure the shape of the lenses specifically for the user 142. For example, focal points and characteristics of the eye of the user 142 may be utilized to adjust the lenses by adjust a current or voltage applied across the lenses. For example, the lenses may be reshaped or provide additional contrast, color enhancement, or so forth for the user 142. This may be particularly useful for users with disabilities or users in difficult situations, such as firemen, police officers, military personnel, security, or so forth. The lenses may be utilized to help correct myopia, hyperopia, presbyopia, and other eye conditions and diseases.

In one embodiment, security content displayed by the smart glasses 142 may be controlled by the user 142 utilizing voice commands received through microphones of the smart glasses 124, or other devices of the network 102. In other embodiments, an administrator or secondary user 144 may control the security content displayed to the user 142 by the smart glasses 124. In one embodiment, different or distinct content may be displayed by each of the lenses (i.e., left lens and right lens). For example, audible commands may be directed to the wireless earpieces 142 that may be converted to instructions for displaying content on the lenses, such as "display a building map on the left and alerts on the right".

As noted, the smart glasses 142 may include a number of sensors including touch sensors, optical sensors, pulse oximeters, microphones, accelerometers, gyroscopes, global positioning chips, and so forth for detecting the biometrics, motion, location, and activities of the user 142. The sensor information may be utilized to coordinate the audio, video, text, and graphical security information presented to the user 142 by the smart glasses 110. For example, the user 142 may select to dismiss content by tilting her head to the left. In one embodiment, the user 142 may program the smart glasses 124 or other security devices 103 to perform specific activities in response to a user motion, command or audio signal, or other action. As a result, the security system 100 may be adapted to the needs and desires of the applicable users 142, 144.

In another embodiment, logical components of the wireless earpieces 124 may utilize one or more projectors, such as a scanning laser or other components to display or reflect images directly or indirectly on the lenses. For example, one or more projectors may project content onto the lenses. In one embodiment, the projectors may be integrated into a portion of the frame, the lenses, or the logical components. The focus, direction, size, and so forth may be adapted so that the content may be properly viewed by the user (whether displayed on the lenses or refracted to the eyes of the user).

In another embodiment, the projectors may include cameras for tracking the eye movements of the user 142. The eye movements may be utilized to make selections, receive user input, or otherwise select content for display by the smart glasses 124. For example, the user 142 may switch between applications, information, or data sets by looking (e.g., tracking retina motion) at specific content, performing specified eye movements, blinking commands, or so forth. In another embodiment, the cameras may also be utilized to use other user 142 clues or actions, such as facial expressions (e.g., motion or shape of the eyes, mouth, eyebrows, cheeks, etc.), hand motions, or other activities to implement specific commands. In another embodiment, the cameras may face forward and may utilize various wavelengths and spectra to enhance the vision of the user 142. For example, infrared, thermal, or other optical or image sensors may take in images and then project those images onto the lenses for viewing by the user 142.

In one embodiment, the smart glasses 124 may utilize short-range or long-range wireless communications to communicate with the smart phone 106 through a wireless signal or devices of the network 102 through other wireless signals. For example, the smart glasses 124 may include a Bluetooth, Wi-Fi, and/or cellular transceiver within the logical components. In one embodiment, the smart glasses 124 may communicate with the smart glasses through a short-range wireless signal, such as Bluetooth, Wi-Fi, Zigbee, Ant+, or other short range wireless communication standards, protocols, or signals. The smart glasses 124 may include any number of logical components. In another embodiment, the smart glasses 124 may be configured to physically connect to or integrate with earpieces. For example, small flexible connectors may be connected to ports of the earpieces.

The display 132 may represent any number of displays, such as monitors, televisions, smart televisions, projectors, holographic displays, or so forth. The holographic display 134 may also represent any number of holographic, three dimensional, or mixed media displays. The display 132 and the holographic display 134 may communicate information, prompts, video, or other content. The display 132 may also represent any number of wearable displays or mobile displays that may be utilized by the users 142, 144.

The smart phones 106, 108, and 110 may represent any number of wireless electronic devices, such as wireless phones, laptops, gaming devices, music players, personal digital assistants, vehicle systems, or so forth. The wireless devices may communicate utilizing any number of wireless connections, standards, or protocols (e.g., near field communications, Bluetooth, Wi-Fi, ANT+, etc.). For example, the smart phone 105 may be a touch screen cellular phone that communicates with the smart glasses 124 utilizing Bluetooth communications. The smart phones 106, 108, 110 may implement and utilize any number of operating systems, kernels, instructions, or applications that may make use of the sensor data or user input received from the security devices 103. For example, the smart phones 106, 108, 110 may represent any number of android, iOS, Windows, open platforms, or other systems. Similarly, the smart phones 106, 108, 110 (or security devices 103) may include a number of applications that utilize the user input, biometric data, and other feedback from the security devices 103 to display applicable security video, audio, information, and data, control the applications, or make other selections.

In another example, the smart glasses 124 may include a flip-down display that may be used to access video. The smart glasses 124 may include any number of front-facing, rear-facing, side-facing, or other cameras for capturing video content. The cameras may be integrated in the frame, hinges, or lenses, or other portions or attachments to the smart glasses 124. The smart glasses 124 may also include speakers, earpieces, or earbuds for communicating audio content. Other tactile, electrical, or other feedback may also be provided. The smart glasses 124 may include one or a number of cameras, microphones, projectors, vibration components, sensors, batteries, connectors, user interfaces (e.g., buttons, touch screens, etc.), or so forth. For example, the microphone and the display of the smart glasses 124 may be utilized to verbally request that video content be streamed from the content captured by the security camera 118.

The content, information, and data captured by the security system 100 may also be retrieved by the security devices 101 based on text, audio, tactile, gestural or other user input, feedback, or requests. For example, a security application executed by the security devices 103 and the security system 100 may provide a user interface for managing the content, information, and data. For example, the user 144 may request that real-time sensor data from the sensors 136, 138, 140 and video from the camera of the laptop 112 be streamed to the smart phone 108 the user 144 is utilizing to perform security functions.

In one embodiment, any number of silent prompts, alerts, messages, or notifications may be sent to the security devices 103 or any of the administrative, management, or other devices of the security system 100 (e.g., security platform 101, digital video recorder 104, etc.). The prompts may include various degrees of alerts or notifications. For example, the alerts may related to medical emergencies, fights, alcohol/drug problems, weapons, injuries, overcrowding, unruly crowds, smoke/fires, maintenance issues, gasses, hazards, or any number of other situations, conditions, suspicious behaviors, or environments that may need to be addressed or at the least monitored. The prompts may provide instructions, command, or feedback as needed, such as evacuation instructions and directions, a location of a nearest aid station, medical instructions, or so forth.

The prompts may be preloaded or stored for quick access. The prompts may include vibrations, sound indicators, flashing lights/screens, light projection, electrical stimuli, and so forth. The prompts may also account for trauma or shock experienced by a user wearing or using one of the security devices 103. For example, the smart watch 130 worn by the user 144 may send an alert to the network 102 to the digital video recorder 104 or the security platform 101 in response to determining the user has been injured, incapacitated, or may otherwise need help or attention. In one embodiment, wearables assigned to each individual in the location 105 may provide applicable information and may include monitoring equipment. The wearables may also provide the prompts and may allow for two-way communications with administrators or professionals operating the security system 100. The wearables may include glasses (e.g., smart, augmented reality, virtual reality, etc.), earpieces, chest devices, smart jewelry, smart clothing, smart watches, hats/helmets, and so forth.

The wearables may include motion sensors, RFID chips, accelerometers, microphones, speakers, touch screens/sensors, pulse oximeters, optical sensors, chemical/air sensors, or so forth. The sensors in the wearables may recognize hand signals, movements, motions and gestures, location, orientation, personal status, activity/action, and so forth. The sensors and other output devices may also be utilized to send the prompts as described herein. As a result, the wearable devices may be utilized to communicate non-verbally or verbally in circumstances where audio, video, or other communications are not available or as required by the user. For example, gestures or other signals may be converted into messages sent from the wearable devices. In one embodiment, the smart glove 129 may be utilized to send and receive non-verbal prompts. The smart glove 129 may include sensors for sending the prompts and receiving input. The smart glove 129 may be configured to understand and transmit American Sign Language and other sign languages. The users may also program gestures and signals of their own choosing to ensure proper receipt and identification.

The security devices 103 in the security system 100 may include any number of cameras either fixed or temporary. Various items of value or other objects within the location 105 may also be integrated with sensors (e.g., proximity, motion, orientation, etc.). The prompt may alert an individual, guard, or security professional with regard to any movements. In one embodiment, the security system 100 may send a prompt to one of the users 142, 144 nearest the movement of the object. As a result, the user(s) 142, 144 may take necessary action.

The drone 141 may represent one or more drones (e.g. single drone, swarms of drones, etc.) that may monitor the location 105. The drone 141 may fly, drive, float, crawl, swim, hop, walk, and/or otherwise navigate the location 105. In one embodiment, the drone 141 may continuously monitor the location 104 (both indoors and outdoors). In another embodiment, the drone 141 may not be activated until needed or otherwise activated.

The users 142 and 144 may represent administrators, military personnel, security professionals (e.g., law enforcement, event security, firemen, etc.), medical professionals (e.g., doctors, nurses, first responders, etc.), media representatives, tourists, government/city employees, staff, event participants, or other types of users.

In one embodiment, the security devices 103 may include any number of input components and sensors that may be utilized to augment the input and sensor readings across devices. For example, the microphone 128 may determine an amount and type of ambient noise. The noise may be analyzed and utilized to filter the sensor readings made by the smart phone 108 to maximize the accuracy and relevance of the sensor measurements of the smart phone 108. For example, the smart phone 108 may adjust the information that is displayed visually to the smart glasses 124 in response to extremely noisy environments (e.g., showing a visual indicator to turn in loud environments, a blind spot indicator, etc.). Filtering, tuning, and adaptation for the sensor measurements may be made for signal noise, electronic noise, or acoustic noise, all of which are applicable in the security system 100. Sensor measurements made by any of the security devices 103 may be communicated with one another in the security system 100.

The security cameras 118, 120, 122 may also represent one or more cameras or a camera system. For example, the camera 118 may represent an array of personal cameras that provide multiple views of the location 105. The cameras 118, 120, 122 may utilize standard lenses, wide-angle lenses, or so forth to monitor the location 105. The cameras 118, 120, 122 may be configured to pivot, rotate, move, elevate or lower, zoom, change illumination, auto-focus, or so forth. The cameras 118, 120, 122 may utilize any number of automatic adjusting features to adjust to available illumination, weather, distance, obstructions, and so forth. In addition, each camera 118, 120, 122 may include a number of different cameras and lenses providing different views. In one embodiment, the cameras 118, 120, 122 may provide a complete or partial view of the location 105.

The user 144 may also wear a smart watch 130 (e.g., Apple, Samsung, Sony smart watches, etc.). The smart watch 136 (or other wearable sensor) may utilize sensing to determine various user biometrics and environmental data. The smart watch 136 may also provide prompts as herein described. The security devices 103 may communicate directly or indirectly (i.e. through the network 102).

In one embodiment, valuable items may be tagged for monitoring whether free standing, within a display/case, or otherwise available. The tags may include microphones, cameras, or other sensors for capturing audio, video, sensor measurements, and so forth. The tags may also include alarms that may be activated based on sound, motion, temperature, or any number of other parameters. The tags may also be remotely activated to generate alerts, such as audio, vibration, textual displays of information, and so forth. For example, the tags may provide instructions to security guards trying to reach a specific location based on proximity, such as "ahead 30 feet on your right the incident was detected." The tags may also communicate with other sensors worn by first responders, security, or other authorized parties to generate real-time mapping data for the security system 100. Delivery of information or data delivered to one or more individuals may be verified. Tags may also provide information to leave or exit the event based on a disaster, accident, or other undesirable event.

Figure 2:
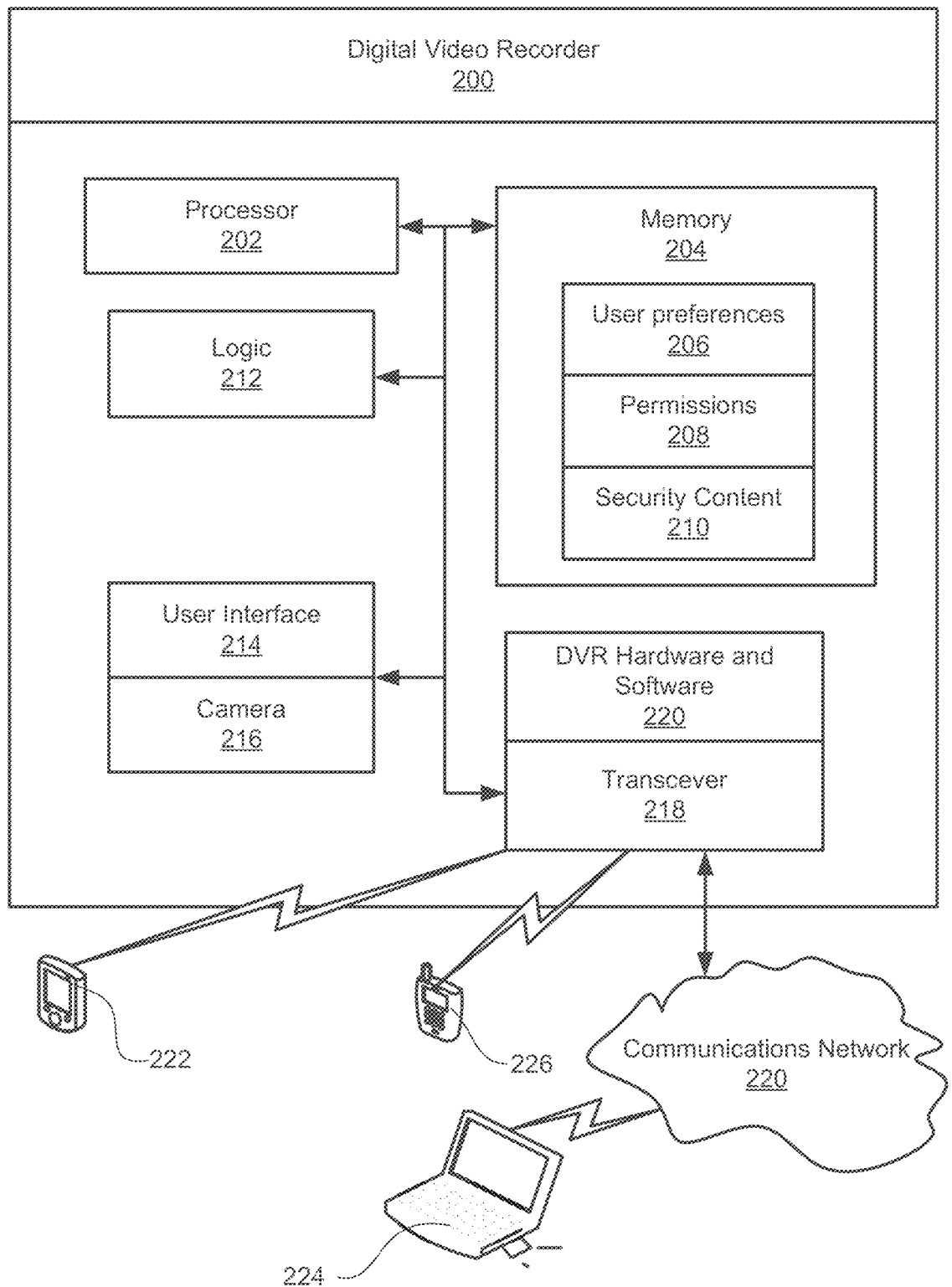
FIG. 2 is a block diagram of a digital video recorder in accordance with an illustrative embodiment.

FIG. 2 is a block diagram of a digital video recorder 200 in accordance with an illustrative embodiment. In one embodiment, the digital video recorder 200 may include a processor 202, memory 204, user preferences 206, permissions 208, content 210, logic 212, user interface 214, camera 216, transceiver 218, and hardware and software 220. The digital video recorder 200 may communicate with communications network 220, and wireless devices 222, 224, and 226. In one embodiment, the digital video recorder 200 may be represented by a single device. In other embodiments, the digital video recorder 200 may represent a number of networked devices that communicate and function together to perform the processes and tasks herein described.

The processor 202 is circuitry or logic enabled to control execution of a set of instructions, application, operating system, kernel, modules, or program. The processor 202 may be a microprocessor, digital signal processor, logic unit, application-specific integrated circuits (ASIC), field programmable gate arrays (FPGA), central processing unit (CPU), or other device suitable for controlling an electronic device including one or more hardware and software elements, executing software, instructions, programs, and applications, converting and processing signals and information, and performing other related tasks. The processor 202 may be a single chip (e.g. ASIC, FPGA, microprocessor, etc.) or may be integrated with other computing or communications elements.

The memory 204 is a hardware element, device, or recording media configured to store data for subsequent retrieval or access at a later time. The memory 204 may be static or dynamic memory 204. The memory 204 may include a hard disk, random access memory, cache, removable media drive, mass storage, or configuration suitable as storage for data, instructions, and information. In one embodiment, the memory 204 and processor 202 may be integrated. The memory 204 may use any type of volatile or non-volatile storage techniques and mediums. The memory may store user preferences 206, permissions 208, and security content 210.

In one embodiment, the memory 204 may store information retrieved by the security system (see for example FIG. 1). For example, the security content 210 captured by the various devices and components, such as audio, video, and sensor data, may be stored and managed by the digital video recorder 200. As a result, the applicable security content 210 may be accessed in real-time or subsequently streamed or sent as needed. The memory 204 may store various data and information that are further associated with the security content, such as date and time of capture, location, observing device/user, type of device, fixed or mobile, authentication, facial recognition, beacon data, and so forth. In some embodiments, the information may be integrated with the security content to create augmented reality content. The memory 204 may also store hyperlinks or other references to interactive content that are accessible by communications received by the digital video recorder 200.

The memory 204 may also store interactive content associated with the security content recorded on the digital video recorder 200. The memory 204 may be partitioned for utilization by the various components of the digital video recorder 200. The digital video recorder 200 may include any number of computing and telecommunications components not specifically described herein for purposes of simplicity, such components, devices, or units may include busses, motherboards, circuits, ports, interfaces, cards, converters, adapters, connections, transceivers, displays, antennas, and so forth that are referenced by the digital video recorder hardware and software 220.

In one embodiment, the user preferences 206 are settings, criteria, and parameters for controlling the security and communications features of the digital video recorder 200. In one embodiment, the user preferences 206 may control registering and authenticating devices/users to communicate security content based on available security feeds, commands, applicable circumstances, feedback, and selections by a user. The user preferences 206 may also include one or more names for a network managed, accessed, utilized, distributed by the digital video recorder 200. For example, the digital video recorder 200 may activate router that communicates utilizing one or more Wi-Fi names that may be utilized by the wireless devices 222, 224, and 226. In one embodiment, the user preferences 206 may store a number of different user profiles associated with a number of administrators or users or the digital video recorder 200 or the wireless devices 222, 224, and 226. The user preferences 206 may store hardware identifiers, software identifiers, nicknames, contact lists, preferred social networking sites and access information including usernames and passwords, and other similar details, information and settings.

In one embodiment, the permissions 208 are the parameters that locally govern the management and utilization of the security content. For example, the permissions 208 may establish types of content, authorize distribution, administrative access, sharing rights, and so forth for security content distributed through the digital video recorder 200, as well as other allowed or prohibited content. In on embodiment, a number of users (e.g., administrators, managers, security personnel, authorized users, etc.) may utilize the digital video recorder 200 and as a result the permissions 208 may set limits and parameters that locally govern utilization of the digital video recorder 200. For example, the permissions 208 may establish authorization levels associated with security content that users of the digital video recorder 200 may store and communicate to the wireless devices 222, 224, and 226. The permissions 208 may also set times of day that the security content may be shared, such as between 8:00 a.m. and 8:00 p.m. times after that may require a special pin number, password, or authorization.

As previously noted, the security content 210 may store content generated by fixed cameras, sensors, or users, such as those using the wireless devices 222, 224, and 226. The captured security content 210 may be stored temporarily, long-term, or permanently in the security content 210 for subsequent access, management, or display (e.g., live stream to the wireless devices 222, 224, and 226). The security content 210 may also be mirrored or stored in one or more cloud networks. For example, the security content 210 may be automatically synchronized with a data storage server of a cloud service/network. By storing the data in the digital video recorder 200 as well as in the cloud, the bandwidth utilized may be reduced, the time required to retrieve the security content in reduced, and other resources may be conserved.

The security content 210 or the user preferences may also store preferences governing utilization of retrieve or user generated security content. For example, the user preferences 206 may specify that the security content 210 may be streamed to the wireless device 222, but may not be shared beyond that one authorized device/user. In another example, while working security for a sporting event, a user may utilize the wireless device 226 to post a video, audio, or text comment associated with a security concern that may be subsequently distributed through the digital video recorder 200 and one or more associated networks. The networks may also include a social network of security personnel that may be utilized to manage events and track potential issues. The security content 210 that is generated from the wireless devices 222, 224, and 226 and other devices may be saved strictly to the digital video recorder 200 or may be saved to remote devices or networks, such as a security-focused social network, cloud file services, cloud system, or so forth. The security data, files, feed, and information may be saved in the security content 210 or saved as a link accessible from one or more other digital video recorders or through other networks.

The user interface 214 is an audio, visual, or tactile interface for displaying video, images, data, text, and information to a user and receiving user input, feedback, selections, and commands. The user interface 214 may generate a graphical user interface for communication to one or more interconnected displays or the wireless devices 222, 224, and 226. The user interface 214 may also be any number of buttons, scroll wheels, screens, touch interfaces, or other elements for receiving and outputting information to a user. In one embodiment, the user interface 214 may provide an interface for receiving input from touch screens, a mouse, microphones, gesture controls, keyboards, peripherals, or so forth. As a result, the user interface 214 may also include a keyboard, a touch screen, a Braille interface, speakers, a microphone, and other similar input and output devices. The wireless devices 222, 224, and 226 may also interact directly with the user interface 214 for receiving input and displaying information.

The camera 216 is a video and image capture device(s). The camera 216 may also represent dedicated or fixed video cameras associated with a venue or location. The images may include still and video images that may be retrieved and stored in the memory 204 or communicated directly to one or more other users. In one embodiment, the camera 216 may be integrated with the digital video recorder 200. In another embodiment, the camera may be externally linked utilizing any number of wireless or wired connections, such as a high definition media interface (HDMI), USB, Bluetooth, or Wi-Fi connection. In particular, the camera 216 may capture the security content 210 for storage. The camera 216 may also be representative of the cameras of the wireless devices 222, 224, and 226 that may transmit content to the digital video recorder 200. For example, the digital video recorder 200 may act as a video router with images, audio, video, text input or a combination thereof communicated from and received by the digital video recorder 200.

The transceiver 218 is a component comprising both a transmitter and receiver which may be combined and share common circuitry on a single housing. The transceiver 218 may communicate utilizing Bluetooth, Wi-Fi, ZigBee, Ant+, near field communications, wireless USB, infrared, mobile body area networks, ultra-wideband communications, cellular (e.g., 3G, 4G, 5G, PCS, GSM, etc.) or other suitable radio frequency standards, networks, protocols, or communications. The transceiver 218 may include a number of different transceivers configured to utilize distinct communications protocols and standards. For example, the transceiver 218 may be a hybrid transceiver that supports a number of different communications. For example, the transceiver 218 may communicate utilizing Ethernet, powerline networking, Wi-Fi, Bluetooth, and cellular signals.

The digital video recorder hardware and software 220 are the additional hardware and software components and units that allow the digital video recorder 200 to function and interact. In one embodiment, the digital video recorder hardware and software 220 may include logical elements for converting signals into media content and interactive content that may be displayed to display. The digital video recorder hardware and software 220 may also incorporate network interface elements for communicating with the communications network 222 which may include a Wi-Fi, cellular, powerline, satellite, cable, DSL, IPTV, or other networks.

For example, the incoming content may be decoded and reformatted for display on a high-definition television or on the wireless devices 222, 224, and 226. For example, the digital video recorder hardware and software 220 may format the satellite signals for display to the user and similarly, may function to display a message icon at the same time the standard content is displayed to the user.

Figure 3:
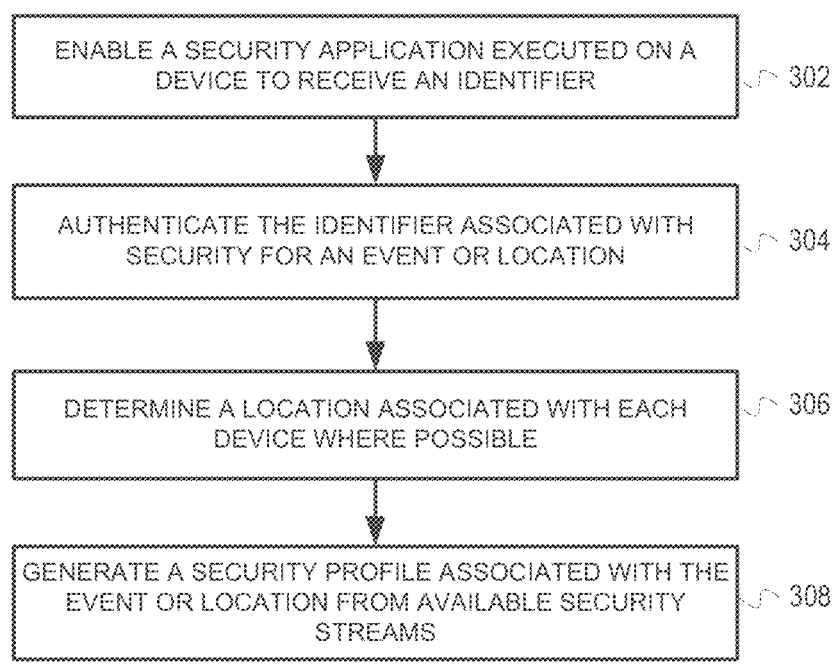
FIG. 3 is a flowchart for authorizing content streams in accordance with an illustrative embodiment.

FIG. 3 is a flowchart for authorizing content streams in accordance with an illustrative embodiment. The process of FIGS. 3 and 4 may be implemented by a mobile device, security system, or networked electronic devices, such as those described in FIG. 1. The security system may be operated by a single provider, entity, group, organization, individual or a combination thereof.

In one embodiment, the process may begin by enabling a security application executed on a device to receive an identifier (step 302). The application may represent a program, script, kernel, software module, or set of instructions executed by one or more electronic devices, such as cellular phones, smart glasses, smart watches, wearables, security cameras, image interfaces (e.g., display, 3-D display, holographic system, augmented reality, virtual reality system, etc.), security systems, digital video recorders, tablets, laptops, desktops, or so forth. In one example, the application may represent a mobile application or dedicated web portal that may be automatically enabled, implemented based on criteria, settings, or parameters, or opened by a user. For example, the application may be automatically opened and enabled in response to a previously given permission (e.g., a consumer requirement to attend a concert) or the associated device reaching a specified location at a specified time. In one embodiment, the mobile application may have been previously opened or running in the background. The security application may also be executed as part of an event application or operating system.

During step 302, one or more cameras, microphones, sensors, and other input devices may be activated for the electronic device(s) in order to capture a security or data stream. The angle, target, positioning, or configuration of the capture components/devices may also be modified based on instructions from the security system, devices, platform, or so forth. The security content/stream may represent one or more of video, audio, sensor measurements (e.g., temperature, wind, speed, altitude, moisture/humidity, seismic information, background noise levels, etc.), location information (e.g., position, orientation, heading, etc.), and other applicable data, information, and values. The information may be associated with a user, device, and/or location.

The identifier may represent any number of pin numbers, passwords, event codes, keywords, passcodes, or other applicable information. In one embodiment, the identifier may enable a security stream associated with the executed security application and corresponding electronic device to be communicated to one or more platforms, systems, aggregation points, routers, servers, or systems for processing as is herein described. In one embodiment, distinct users and devices may be assigned distinct identifiers. However, in other embodiments, a single identifier may be utilized by a number of different users/devices to create a group security session, aggregated security, or other combination of content.

Next, the security system authenticates the identifier associated with security for an event or location (step 304). Any number of secured connections, standards, or protocols may be utilized to secure communications made within, to, and from the security system. The security system may utilize any number of memories, logic, databases, or other storages to store and authenticate the identifier. For example, the identifier may be compared against allocated identifiers provided for one or more devices of the security system. In one embodiment, the identifier may also include information, such as a username, device type, device location, IMEI, IP address, serial number, or so forth. The information may be utilized to personally identify the user and/or device for documentation, electronic mapping, verification, or so forth.

Next, the security system determines a location associated with each device where possible (step 306). The location may be determined from any number of active or passive components or processes. For example, the location may be determined utilizing any number of components or processes, such as global positioning systems (GPS), beacons, sensors, wireless triangulation, directional detectors/antennas, signal strength, or so forth.

Next, the security system generates a security profile associated with the event or location from available security streams (step 308). The security profile may include a number of security streams aggregated from distinct devices/users and accessible through a user interface of the security system. In another embodiment, the security profile may be referred to as security content, aggregated content, available content, streaming security, or so forth. The security streams may be assigned a priority based on location, content, thresholds, or so forth. For example, security content on and around a stage where a high profile performance is being carried out may have more security streams than the areas associated with food processing (even though all areas may have some associated security content).

Figure 4:
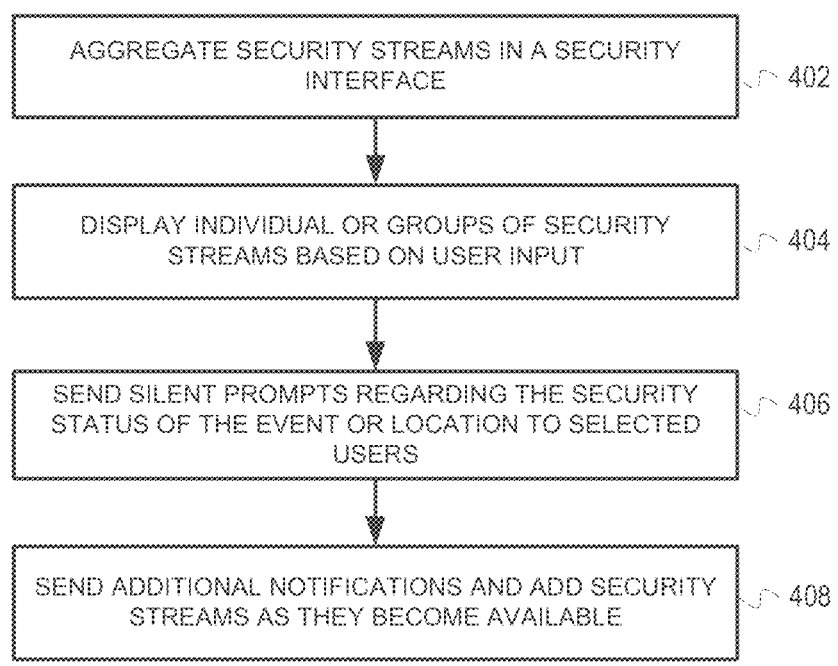
FIG. 4 is a flowchart of a process for aggregating security content in accordance with an illustrative embodiment.

FIG. 4 is a flowchart of a process for aggregating security content in accordance with an illustrative embodiment. The process may begin by aggregating security streams in a security interface (step 402). The security streams may be captured by fixed or temporary resources. Fixed resources may be integrated with or fixed to a location, structure, or event, such as dedicated security cameras. Temporary resources may represent resources that may be moved from place-to-place, temporarily available, or so forth. For example, temporary resources may include towers, broadcast trucks, wireless devices, and so forth. Temporary resources may also represent personal consumer-electronics, such as cell phones, gaming devices, tablets, wearables (e.g., smart watches, bands, glasses, headphones, implantables, etc.).

Next, the security system displays individuals or groups of security streams based on user input (step 404). In another embodiment, the content may be displayed automatically in response to specific conditions, thresholds, criteria, parameters, or settings being met (e.g., unusual movements, high user density, audio thresholds being exceeded, etc.). The user input may be received through a touch screen, user interface, augmented reality system, virtual reality system, or so forth. For example, the user may easily scroll, switch, navigate, or manage various security streams to find individual streams or groups of streams that may be selected for viewing, recording, analysis, or additional processes. In one embodiment, the content of the security streams may be played in small windows or thumbnails so that a user may easily select important content.

Next, the security system sends silent prompts regarding the security status of the event or location to selected users (step 406). The silent prompts may indicate the status of the location and event. In one embodiment, the silent prompts may be sent in response to thresholds, conditions, parameters, user preferences, or so forth. For example, one or more users or administrators may establish how, when, and to whom prompts, alerts, or messages are sent. For example, the prompts may include a link to specific security feeds for individuals providing security for an event. The individuals may represent people within a security/viewing booth, event security, police officers, special forces, undercover agents, or so forth. The individuals receiving the silent prompts may be locally or remotely located. For example, alerts may be sent through smart gloves to provide instructions to a detected event (e.g., visual LED feedback, tactile feedback, etc.). The prompts may represent emails, texts, in-app messages, tactile alerts, vibrations, chimes/sounds, or a combination thereof. Audible alerts may also be utilized in some embodiments. For example, for severe events (e.g., fire, terrorism, earthquakes, etc.) exit instructions and feedback may be sent to every available participant at an event. Silent feedback or input may also be communicated back to the security system to provide additional information. This may be particularly important if verbal, video, or GPS communications are lost or not possible. Smart gloves may also be utilized to communicate information (e.g., to the security system, administrators, team members, event participants, etc.) utilizing American Sign Language, hand signals, or other gestural forms of communication (known or customized).

Next, the security system sends additional notifications and adds security streams as they become available (step 408). Additional notifications may be sent as needed or as additional users are authorized to receive notifications. Additional security streams may be added as additional devices/users interface with the security system. As a result, the security system may be expanding and advanced at all times. Audio, video, and sensor data may also be received at all times for providing updated information.

The security system may save all or a portion of the security streams as received. The security streams may be archived for temporary or long-term usage, subsequent training videos, analysis, or so forth. In other embodiments, privacy, confidentiality, or other policies, laws, regulations, or procedures may require that the security content is destroyed immediately, if there is no irregular event, or within a designated time period. The security system may be saved and accessed through one or more networks or signals, such as private networks, cellular networks, temporary networks, cloud networks, or other applicable networks, radio frequency signals, or protocols. In some situations, security content may be communicated to all devices and parties available to receive the applicable format (e.g., stream video, audio, still images, graphics, animations, etc.).

In one embodiment, labels associated with the applicable device may be automatically added to the feed or stream. The label may include information, such as source (e.g., Brian's GoPro on level 2, cell phone in standing area B, audio of backstage North side from employee 32's cell phone, etc.). The labels may be automatically added as needed utilizing the application or at the security system. The security system may also In one embodiment, specialized commands, instructions, or input may be sent to the devices generating the security streams to perform specific processes, such as audio, video, or sensor measurements. For example, the facial or body profile of a questionable person may be specifically searched for by the security application. The security system may also automatically display specified content, such as very rapid motions, locations associated with noises above a threshold (e.g., yelling, explosions, etc.), dense groups of people (e.g., determined from images, location information, audio, etc.). The participants may also be periodically accessed about their status or the status of the event from their location or perspective, such as normal, happy, too loud, people getting wild, no one present, dangerous, feeling scared, perfect, or so forth.

In one embodiment, the users participating in streaming the security content may be compensated utilizing any number of monetary or non-monetary processes or systems (e.g., electronic deposits, electronic coins, discounts, coupons, rebates, cash, apparel, merchandise, etc.). The compensation may be received before, during, or after participation in the security of the event or location.

The illustrative embodiments provide a system, method, and network for provisioning a security system. The security system may make data, information, and feeds available to numerous authorized users. The security system may be enhanced or improvised as needed to meet applicable conditions, environments, activities, actions, or threats. Prompts or alerts may be sent as needed. The security system may be utilized by law enforcement, security officers/patrols, fire fighters, first responders, maintenance, airport security, tourism locations, reconnaissance efforts, television crews, and so forth.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 5:
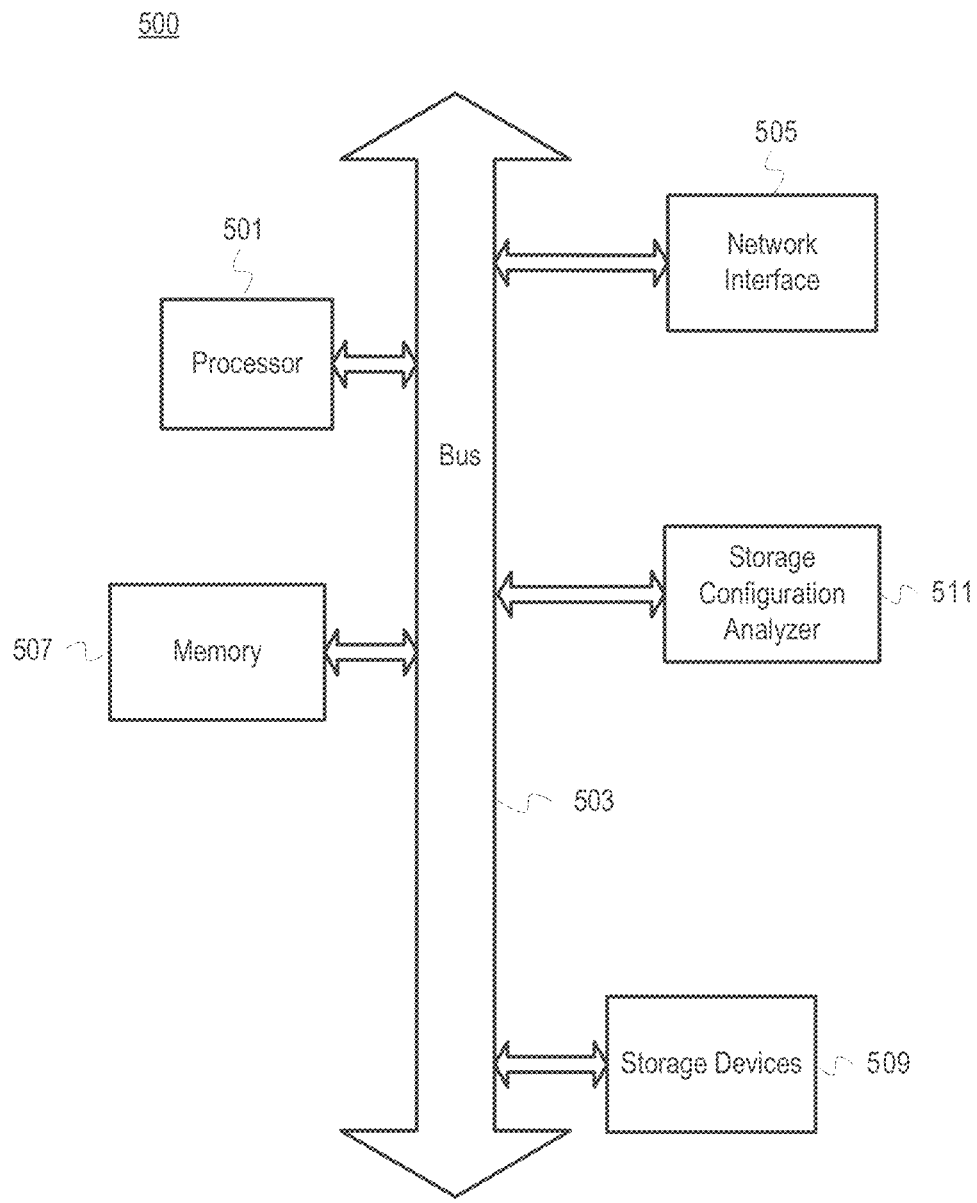
FIG. 5 depicts a computing system 500 in accordance with an illustrative embodiment.

FIG. 5 depicts a computing system 500 in accordance with an illustrative embodiment. For example, the computing system 500 may represent an electronic computing or communications device, such as a smart phone, tablet, glasses, or any of the security devices 103 of FIG. 1. The computing system 500 may represent or communicate with wireless phones, augmented reality glasses, tablets, computers, routers, servers, sensors, or other electronics, devices, systems, equipment, or components. The computing device 500 may be utilized to receive user settings, instructions, applications, parameters, thresholds, messages, data feeds/streams, or other data and information for performing the security processes herein described. The computing system 500 includes a processor unit 501 (possibly including multiple processors, multiple cores, multiple nodes, and/or implementing multi-threading, etc.). The computing system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 503 (e.g., PCI, ISA, PCI-Express, HyperTransport®, InfiniBand®, NuBus, etc.), a network interface 505 (e.g., an ATM interface, an Ethernet interface, a Frame Relay interface, SONET interface, wireless interface, etc.), and a storage device(s) 509 (e.g., optical storage, magnetic storage, etc.). The system memory 507 embodies functionality to implement embodiments described above. The system memory 507 may include one or more functionalities that recognize user information for communicating with smart phones, augmented reality glasses, or so forth. The system memory 507 may also process audio input received from smart phones, glasses, tablets, wearables, security cameras, or other devices. Code may be implemented in any of the other devices of the computing system 500. Any one of these functionalities may be partially (or entirely) implemented in hardware and/or on the processing unit 501. For example, the functionality may be implemented with an application specific integrated circuit, in logic implemented in the processing unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501, the storage device(s) 509, and the network interface 505 are coupled to the bus 503. Although illustrated as being coupled to the bus 503, the memory 507 may be coupled to the processor unit 501.

The illustrative embodiments are not to be limited to the particular embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for providing security, comprising:
aggregating security content in real-time from a plurality of wireless devices at least a portion of which are carried by a plurality of users and a plurality of fixed devices positioned for security at an event, wherein the plurality of wireless devices are associated with at least the portion of the plurality of users attending the event on foot, wherein the event is preplanned for a location and the plurality of users attending the event, and wherein the security content includes at least audio or video and a location;
displaying a selection of the security content captured by the wireless devices at the event via a security interface; and
automatically sending prompts regarding a security status of the event to selected users including users attending the event based on their location within the event venue and detected security conditions.

2. The method of claim 1, wherein the security content includes streaming content captured by the plurality of wireless devices and the plurality of fixed devices at the event.

3. The method of claim 1, further comprising:
adding additional streams of security content as the streams of security content become available from the plurality of wireless devices.

4. The method of claim 1, wherein the prompts are automatically sent in response to one or more thresholds or criteria being met.

5. The method of claim 1, wherein the plurality of wireless devices are from at least the portion of plurality of users that are on foot at the event, and wherein the fixed devices include one or more of fixed video cameras, microphones, and sensors.

6. The method of claim 1, further comprising:
enabling a security application executed on the plurality of wireless devices to receive an identifier;
authenticating the identifier is associated with security for the event; and
determining a location associated with each of the plurality of wireless devices.

7. The method of claim 1, further comprising:
generating a security profile associated with the event from the security content.

8. The method of claim 1, further comprising:
compensating the at least portion of the plurality of users that share security content.

9. The method of claim 8, wherein the compensation is payable through one or more of payments of money and discounts for services or products.

10. The method of claim 1, further comprising:
determining locations for each of the plurality of wireless devices; and
associating the security content from each of the plurality of wireless devices with the locations.

11. The method of claim 1, wherein the security content is received by a cloud system for processing.

12. A network storage device for providing security, comprising:
a processor executing a set of instructions; and a memory storing the set of instructions, wherein the set of instructions are executed by the processor to:

aggregate security content in real-time from a plurality of wireless devices at least a portion of which are carried by a plurality of users and a plurality of fixed devices positioned for security at an event, wherein the plurality of wireless devices are associated with at least the portion of the plurality of users attending the event on foot, wherein the event is preplanned for a location and the plurality of user attending the event, and wherein the security content includes at least audio or video and a location;

display a selection of the security content captured by the wireless devices at the event via a security interface; and automatically send prompts regarding the security status of the event to selected users including users attending the event based on their location within the event venue and the detected security conditions.

13. The network storage device of claim 12, wherein the set of instructions are further executed to:

enable a security application executed on the plurality of wireless device to receive an identifier;

authenticate the identifier associated with security for a location;

determine a location associated with the wireless device to be sent as part of the security content.

14. The network storage device of claim 12, wherein the set of instructions are further executed to:

generate a security profile associated with the security content, wherein the security content indicates locations associated with the plurality of wireless devices and the plurality of fixed devices.

15. The network storage device of claim 12, wherein the security content includes streaming content and images captured by the plurality of wireless devices and the fixed devices.

16. The network storage device of claim 12, wherein the prompts are automatically sent in response to one or more thresholds or criteria being met.

17. The network storage device of claim 12, wherein the plurality of wireless devices are from at least the portion of plurality of users that are on foot at the event, and wherein the fixed devices include one or more of fixed video cameras, microphones, and sensors.

18. The network storage device of claim 12, wherein the set of instructions are further executed to:

compensate the at least portion of the plurality of users that share security content.

19. The network storage device of claim 12, wherein the set of instructions are further executed to:

determine locations for each of the plurality of wireless devices; and associate the security content from each of the plurality of wireless devices with the locations.

20. The network storage device of claim 12, wherein the network storage device is integrated as part of a cloud network.

* * * * *